May 3, 1932.  C. E. SCHUELLER  1,856,436

BANK, TURN, AND CLIMB INDICATOR FOR AIRCRAFT

Filed May 21, 1928  2 Sheets-Sheet 1

INVENTOR.
CASPER E. SCHUELLER.
BY
Munn & Co.
ATTORNEYS.

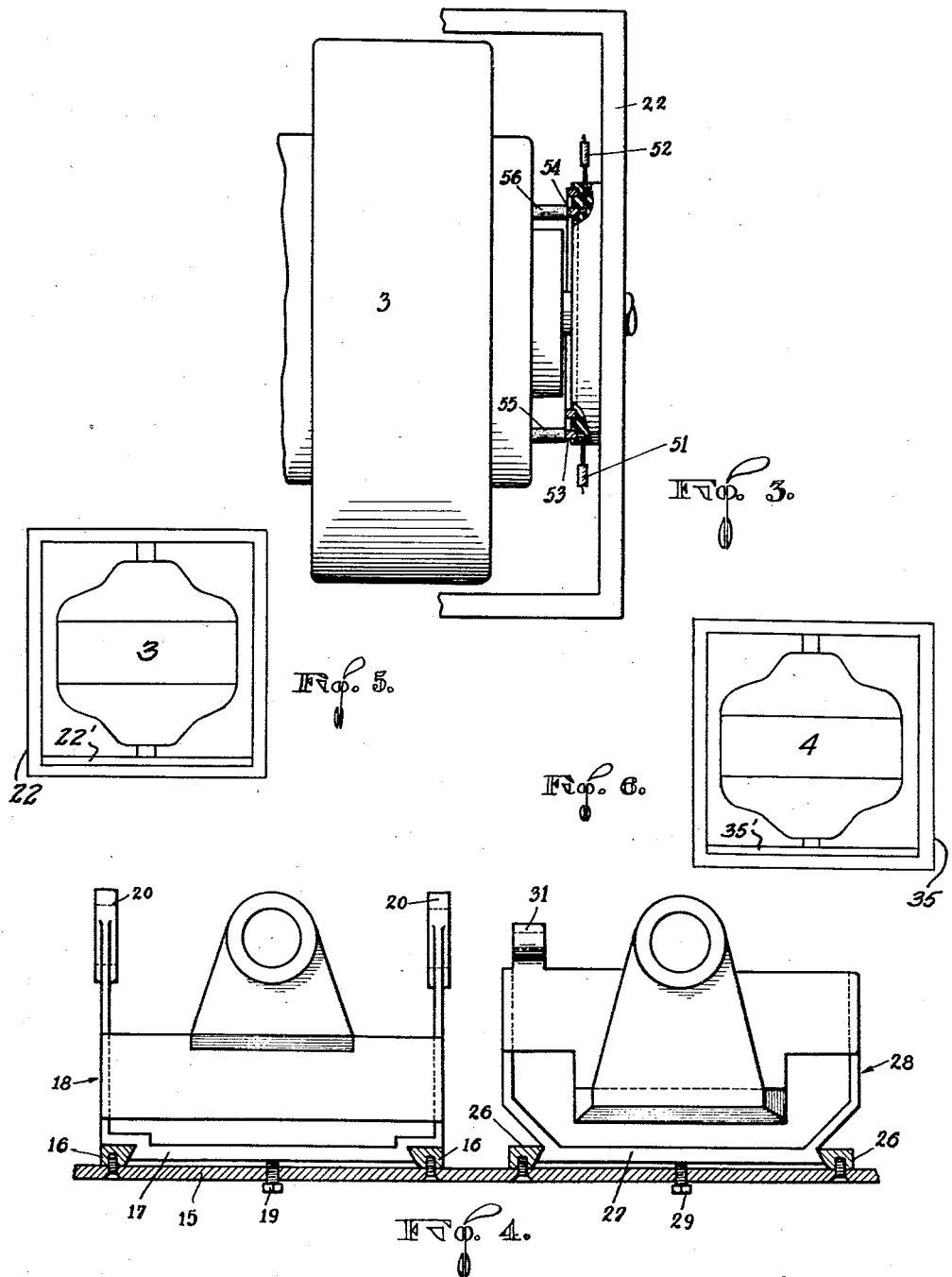

Patented May 3, 1932

1,856,436

UNITED STATES PATENT OFFICE

CASPER E. SCHUELLER, OF BERKELEY, CALIFORNIA, ASSIGNOR TO ERGO A. MAJORS, OF PIEDMONT, CALIFORNIA

BANK, TURN, AND CLIMB INDICATOR FOR AIRCRAFT

Application filed May 21, 1928. Serial No. 279,488.

My invention relates to improvements in bank, turn, and climb indicators for aircraft which will indicate the exact degree of inclination of the craft while in the air, and which will show a reading throughout a complete circle. The standard bank indicator functions until the plane reaches approximately an inclination of fifteen degrees in either direction. Any point beyond this will not be indicated by the instrument.

A further object of my invention is to provide an instrument which shows by a pair of dials and pointers the exact relation the aircraft bears to the earth, the pointers showing on the dials at all times the angle at which the aircraft is banking, turning, or climbing at any moment the pilot desires to find out this information.

A further object of my invention is to provide a device of the type described which is simple in construction and which may be attached to any aircraft without any alterations being necessary in the latter.

Other objects and advantages will appear in the following specification, and the novel features of the device will be particularly pointed out in the appended claim.

My invention is illustrated in the accompanying drawings forming a part of this application, in which Figure 1 is a front view of the panel;

Figure 3 is a section along the line 3—3 of Figure 2;

Figure 4 is a section along the line 4—4 of Figure 2; and

Figures 5 and 6 are side elevations of the gyroscope-supporting members.

Figure 1:
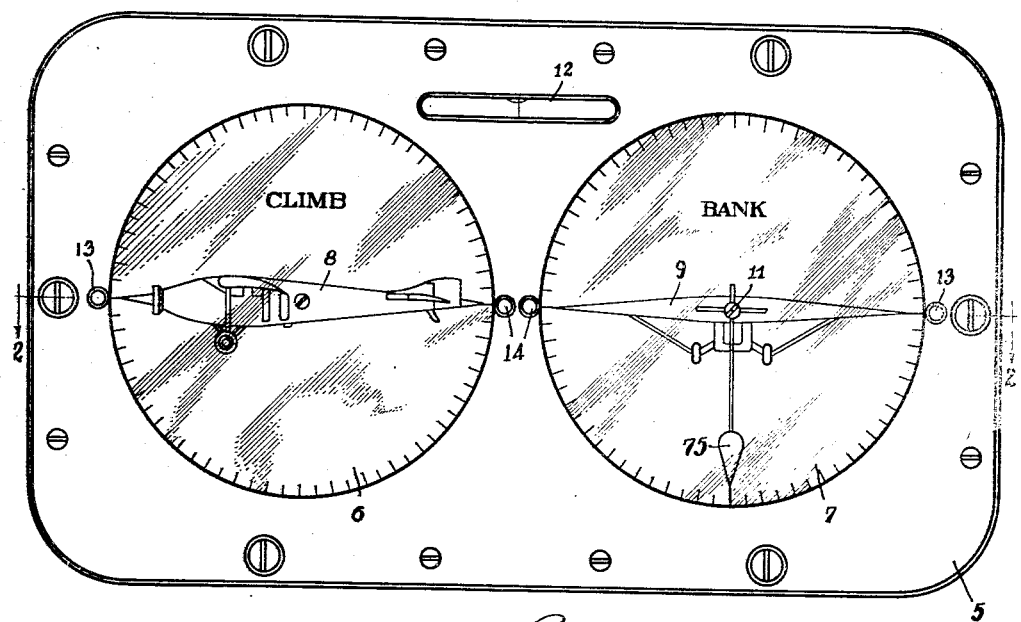

In carrying out my invention, I provide a casing 1 (see Figure 2) which is divided into two compartments A and B by a partition 2. In each compartment I mount a gyroscope, and will hereinafter refer to the gyroscope 3 as being in compartment A and gyroscope 4 as being in compartment B.

The casing 1 is covered by a front panel 5, and this panel is provided with two dials 6 and 7 which constitute a "climb" dial and a "bank" dial. Pointers or indicators 8 and 9 in the shape of airplanes are mounted upon shafts 10 and 11 and indicate the degree of inclination of the aircraft. The pointer 8 shows a side elevation of an airplane, and this pointer informs the pilot of the angle of climb. The pointer 9 shows a rear view of the airplane, and the wings of this airplane indicate the angle or degree of banking. This type of pointer in place of the usual arrowhead is not so likely to confuse the pilot, and moreover a combination of both show the exact position of the plane while in the air.

If desired, the panel may be provided with a spirit level 12, green lights 13, and red lights 14. These lights are for the purpose of informing the pilot whether he is flying upside down or not, because if it were not for these lights the plane might take a complete turn in the air and if the vision were obscured by fog, storm, or the like, the pilot would have no means of quickly determining whether he is flying right side up or not. A simple arrangement such as the lights 13 and 14 would obviate errors which might prove fatal.

I will first describe the climb indicator mechanism. Reference to Figure 4 shows a fragmentary view of the bottom 15 of the casing 1. This bottom carries guide flanges 16, and these form a dove-tail slot for receiving a dove-tail projection 17 of a frame 18. The frame is locked in place by a set screw 19.

In the aligned bearings 20 of the frame, I mount one member 21 of a gimbal. The other member 22 of the gimbal is mounted in bearings indicated generally at 23 (see Figure 1) which extend at right angles to the bearings 20. The member 22 supports the gyroscope 3, and the axis of the gyroscope is vertically disposed. This construction gives a universal movement between the gyroscope and the casing 1 and permits the gyroscope to remain vertical irrespective of the angular positions assumed by the casing 1.

A bevel gear 24 is rigidly connected to the member 21 and is turned therewith. This gear meshes with a bevel gear 25 which in turn is mounted upon the shaft 10. It will therefore be seen from this construction that the gyroscope 3 will remain vertical, that the casing 1 will be turned into angular positions when the airplane is so turned, and that the relative movement between the casing and the gyroscope will cause a swinging of the member 21 with respect to the casing, and this movement will be imparted to the gears 24 and 25 and will cause the indicator 8 to register the exact angle at which the casing 1 is tipped with respect to the horizontal. The pilot glances at the indicator and knows at what angle his plane is climbing or descending.

The gyroscope 4 and its mountings are somewhat the same as those for the gyroscope 3. The compartment B has flanges 26 forming a dove-tail slot for receiving a dove-tail projection 27 of a frame 28. A set screw 29 locks the frame in place. This frame is provided with aligned bearings 30, only one of which appears in Figure 4 due to the fact that the other is disposed directly in back. The frame also carries a small bearing 31. In the aligned bearings 30 I mount one member 32 of a gimbal. This member carries bearings 34 which support the other member 35 of the gimbal. The gyroscope is carried by the member 35, and its axis extends vertically. The members 22 and 35 are weighted at their bottoms as shown at 22' and 35' in Figures 5 and 6 in order that the gyroscopes 3 and 4 will always tend to remain in vertical positions.

The connections between the indicator 9 and the gyroscope consists of the shaft 11, bevel gears 36, 37 and 38, and the gimbal comprising the members 32 and 35. When the casing 1 inclines laterally due to the banking of the aeroplane, the gyroscope 4 remains vertical, and there is therefore a relative movement between the gyroscope, the member 32, and the frame 28. This movement causes a turning of the gear 38, which in turn moves the indicator 9. Both gyroscopes are so mounted within their respective gimbals as to permit the aircraft to loop the loop or to corkscrew through the air without affecting the instrument in any way.

Figure 2:
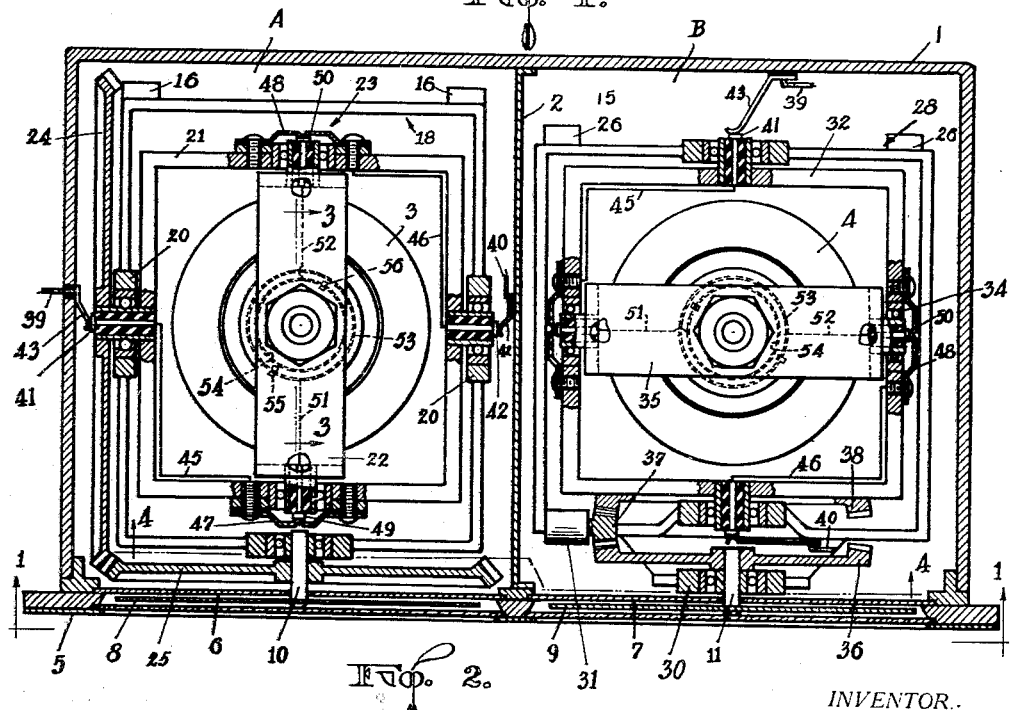
Figure 2 is a section along the line 2—2 of Figure 1.

In Figures 2 and 3 I show the way the gyroscopes are connected with a source of current. Lead-in wires 39 and 40 are electrically connected to pins 41 and 42 respectively by brushes 43 and 44. Wires 45 and 46 lead from the pins to brushes 47 and 48. These in turn are electrically connected to pins 49 and 50. Wires 51 and 52 lead from the pins 49 and 50 to annular rings 53 and 54 (see Figure 3). Brushes 55 and 56 extending from the gyroscope 3 contact with the rings. The wiring for the gyroscope 4 is similar, and therefore needs no further explanation.

From the foregoing description of the various parts of the device, the operation thereof may be readily understood.

The panel 5 is placed at any convenient point on the instrument board, and the lead-in wires 39 and 40 are connected to a source of current not shown. The device is now ready to function as soon as current is delivered to the gyroscopes 3 and 4. In case the pilot takes a number of loops, the indicator 8 will appear to make a series of complete circles. The indicator 8 will also show when the airplane is climbing or going down. Should the pilot cause his plane to corkscrew through the air, the indicator 9 would take a number of complete revolutions. Any banking at the turns will also be shown by the indicator 9. The pilot can ascertain his exact position in the air by glancing at both indicators. The device is simple in construction, and provides novel and efficient means for showing at a glance the angle at which the aircraft is disposed with respect to the ground.

A turn indicator is mounted on dial 7 and comprises a weighted hand 75 rotatably mounted on the shaft 11. Any turning of the plane will cause the arm to swing by centrifugal force to indicate the turn even though the plane is not banking.

It is obvious that the device can be attached to other craft such as a submarine.

Although I have shown and described one embodiment of my invention, it is to be understood that the same is susceptible of various changes, and I reserve the right to employ such changes as may come within the scope of the appended claim.

I claim:

A bank, turn and climb indicator for aircraft comprising a casing securable to the aircraft and having a pair of dials disposed close to each other and in substantially the same plane, a pointer for each dial, one of the pointers being in the shape of a side view of an airplane and the other pointer being in the shape of a rear view of the same airplane, and means disposed within said housing for automatically swinging said pointers with respect to said housing for continuously indicating respectively the longitudinal and lateral attitude of the craft.

CASPER E. SCHUELLER.